US012798159B2

(12) United States Patent
Lazalier et al.

(10) Patent No.: US 12,798,159 B2
(45) **Date of Patent: *Nov. 17, 2026**

(54) MOLD AND METHOD FOR FORMING A MOLDED PART

(71) Applicant: Hubbell Incorporated, Shelton, CT (US)

(72) Inventors: Ray Melton Lazalier, Lake St. Louis, MO (US); Matthew Raymond Bednara, Collinsville, IL (US)

(73) Assignee: Hubbell Incorporated, Shelton, CT (US)

( * ) Notice: Subject to any disclaimer, the term of this patent is extended or adjusted under 35 U.S.C. 154(b) by 637 days.

This patent is subject to a terminal disclaimer.

(21) Appl. No.: 18/351,741

(22) Filed: Jul. 13, 2023

(65) Prior Publication Data

US 2023/0347551 A1 Nov. 2, 2023

Related U.S. Application Data

(60) Continuation of application No. 17/241,770, filed on Apr. 27, 2021, now Pat. No. 11,745,394, which is a division of application No. 15/664,547, filed on Jul. 31, 2017, now Pat. No. 11,020,880.

(60) Provisional application No. 62/369,494, filed on Aug. 1, 2016.

(51) Int. Cl.

*B29C 33/42* (2006.01)
*B29C 39/26* (2006.01)
*B29L 31/00* (2006.01)

(52) U.S. Cl.

CPC .............. *B29C 33/42* (2013.01); *B29C 39/26* (2013.01); *B29L 2031/757* (2013.01)

(58) Field of Classification Search

CPC .... B29C 33/26; B29C 33/42; B29L 2031/757
See application file for complete search history.

(56) References Cited

U.S. PATENT DOCUMENTS

| | | | |
|---|---|---|---|
| 1,982,279 | A | 11/1934 | Apple |
| 3,000,049 | A | 9/1961 | Terry, Jr. |
| 3,202,033 | A | 8/1965 | Weidner, Jr. |
| 3,377,654 | A | 4/1968 | Albert |
| 3,871,611 | A | 3/1975 | Taketa |
| 4,123,495 | A | 10/1978 | Abey |
| 4,519,569 | A | 5/1985 | Nolan |
| 4,856,977 | A | 8/1989 | Von Holdt |
| 4,956,142 | A | 9/1990 | Mangone, Jr. |

(Continued)

OTHER PUBLICATIONS

International Search Report and Written Opinion issued on Oct. 20, 2017, by the International Searching Authority in corresponding International Patent Application No. PCT/US2017/044651. (16 pages).

(Continued)

*Primary Examiner* — Emmanuel S Luk
(74) *Attorney, Agent, or Firm* — Robinson + Cole LLP

(57) ABSTRACT

A mold includes a first mold portion, a second mold portion, and a projection. The second mold portion is secured against the first mold portion along a draw axis to form at least one mold cavity. The second mold portion includes an internal surface oriented at an oblique angle relative to the draw axis. The projection extends from the internal surface along a projection axis. The projection forms an elongated profile including a first end, a second ends, and a pair of side surfaces extending between the first end and the second end.

20 Claims, 16 Drawing Sheets

(56) References Cited

U.S. PATENT DOCUMENTS

| | | | |
|---|---|---|---|
| 5,074,771 | A | 12/1991 | Thakrar et al. |
| 5,335,802 | A | 8/1994 | Brach et al. |
| 5,738,886 | A | 4/1998 | Asai |
| 5,897,889 | A | 4/1999 | Shao |
| 6,164,953 | A | 12/2000 | Winget |
| 6,267,530 | B1 | 7/2001 | Attar |
| 6,491,854 | B1 | 12/2002 | Sano |
| 6,655,952 | B1 | 12/2003 | Kraft |
| 6,682,336 | B1 | 1/2004 | Lee |
| 6,740,281 | B2 | 5/2004 | Pinyayev et al. |
| 6,821,051 | B2 | 11/2004 | Attar |
| 7,179,406 | B1 | 2/2007 | Attar |
| 7,597,550 | B2 | 10/2009 | Lee et al. |
| 7,632,447 | B2 | 12/2009 | Swistak et al. |
| 7,794,286 | B2 | 9/2010 | AbuGhazaleh et al. |
| 9,744,735 | B2 | 8/2017 | Iizuka et al. |
| 10,239,162 | B2 | 3/2019 | Hoagland et al. |
| 10,252,126 | B2 | 4/2019 | Paquette et al. |
| 10,315,343 | B2 | 6/2019 | Kutsuwada et al. |
| 2001/0040309 | A1 | 11/2001 | Hong |
| 2001/0048180 | A1 | 12/2001 | Cupples |
| 2002/0096801 | A1 | 7/2002 | Puniello et al. |
| 2003/0153402 | A1 | 8/2003 | Simonds et al. |
| 2004/0188447 | A1 | 9/2004 | Bolzer |
| 2005/0031722 | A1 | 2/2005 | Hung |
| 2005/0098921 | A1 | 5/2005 | Endo et al. |
| 2005/0238744 | A1 | 10/2005 | Nakai |
| 2005/0253294 | A1 | 11/2005 | Takano et al. |
| 2006/0115551 | A1 | 6/2006 | Peukert |
| 2007/0269551 | A1 | 11/2007 | Liao |
| 2010/0068454 | A1 | 3/2010 | Hsu et al. |
| 2010/0119643 | A1 | 5/2010 | Boukobza |
| 2010/0289180 | A1 | 11/2010 | Soubjaki |
| 2011/0042847 | A1 | 2/2011 | Ogawa et al. |
| 2011/0180963 | A1 | 7/2011 | Kuno et al. |
| 2012/0231229 | A1 | 9/2012 | Yano |
| 2014/0328969 | A1 | 11/2014 | Pettigrew et al. |
| 2019/0061908 | A1 | 2/2019 | Kierbel et al. |

OTHER PUBLICATIONS

First Office Action issued on Aug. 4, 2020, by the China National Intellectual Property Administration in corresponding Chinese Patent Application No. 201780048038.8 and an English translation of the Action. (17 pages).

Examination Report issued on Feb. 26, 2021, by the Indian Patent Office in corresponding Indian Patent Application No. 201917003952 and an English translation of the Action. (6 pages).

MOLD AND METHOD FOR FORMING A MOLDED PART

CROSS-REFERENCE TO RELATED APPLICATION

This application is a continuation of prior-filed, co-pending U.S. patent application Ser. No. 17/241,770, filed Apr. 27, 2021, which is a divisional of U.S. patent application Ser. No. 15/664,547, filed Jul. 31, 2017, which claims the benefit of U.S. Provisional Patent Application No. 62/369,494, filed Aug. 1, 2016. The entire contents of these applications are incorporated by reference herein.

BACKGROUND

The present application relates to a mold, and more specifically to a mold and method for forming a feature on an inclined molded surface without requiring side action.

SUMMARY

When die-casting or molding components, it can be necessary to form features such as apertures on inclined surfaces. The apertures are difficult to form during molding since the surfaces are oblique or not normal nor parallel to the draw direction, or the axis along which the mold portions are separable. Forming the features typically requires the use of side action in the mold, or requires machining or other post-processing steps after molding is complete.

In one aspect, a method for forming an aperture on an inclined surface of a molded part includes: securing a first mold portion against a second mold portion to form a mold cavity, the first mold portion and the second mold portion secured along a draw axis, at least one of the first mold portion and the second mold portion including an internal surface and a projection extending away from the internal surface along a projection axis, the internal surface oriented at an oblique angle relative to the draw axis; introducing liquid material into the mold cavity; and solidifying the material in the mold cavity around the projection to form the molded part having at least one aperture on at least one inclined surface.

In another aspect, a mold includes a first mold portion, a second mold portion, and a projection. The second mold portion is secured against the first mold portion along a draw axis to form at least one mold cavity. The second mold portion includes an internal surface oriented at an oblique angle relative to the draw axis. The projection extends from the internal surface along a projection axis. The projection forms an elongated profile including a first end, a second ends, and a pair of side surfaces extending between the first end and the second end.

Other aspects of the application will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a mold which can be used in die-casting or a similar process. Features of the mold form an aperture on an inclined or oblique surface of the molded part without requiring additional machining.

Figure 1:
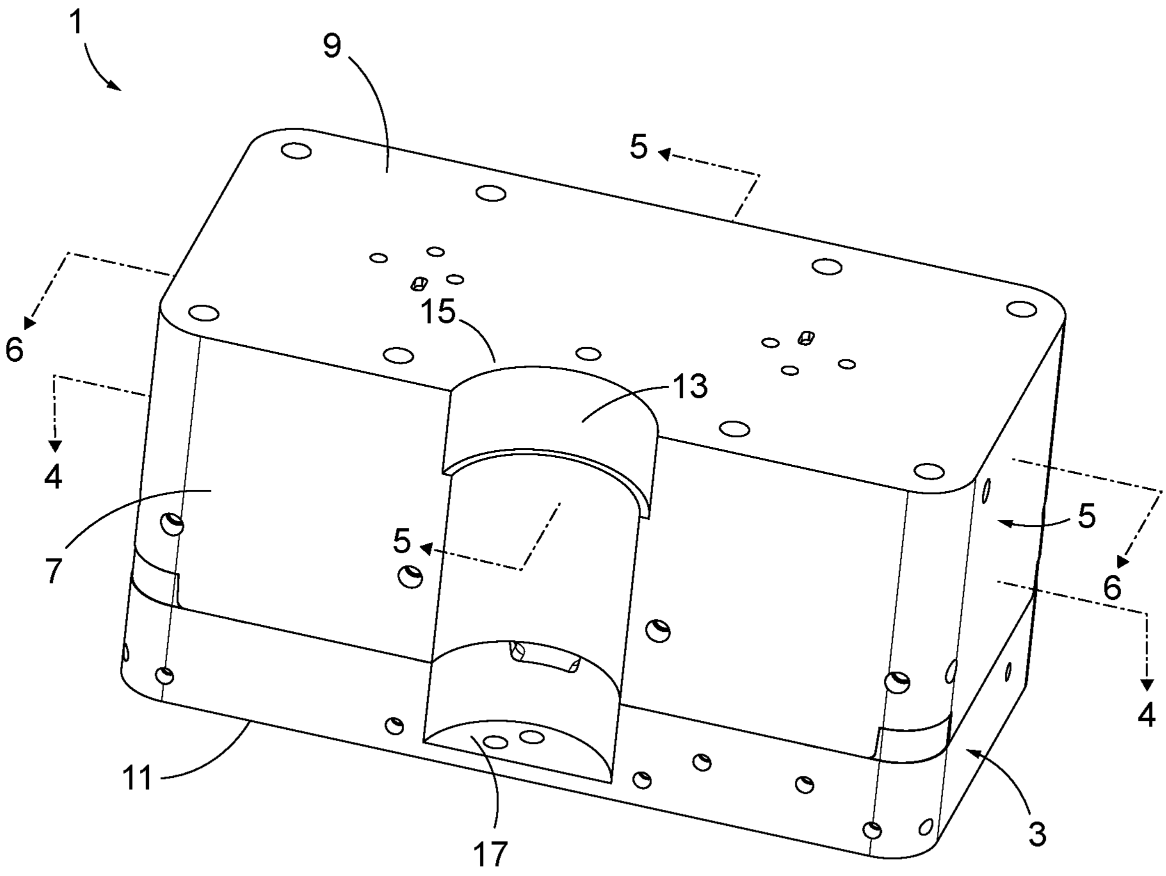
FIG. 1 is a perspective view of a mold.

FIG. 1 shows a mold 1 including a first mold portion 3 and a second mold portion 5. In the illustrated embodiment, the surfaces of the mold 1 are generally rectangular in shape, and the edges are curved. The first mold portion 3 and the second mold portion 5 are secured against movement relative to one another and may be flush with respect to one another. A first surface 7 of the mold 1 has an injection sleeve 13 that is generally semi-circular in shape. In the illustrated embodiment, the injection sleeve 13 extends only partially between an upper or second surface 9 and an opposing lower or third surface 11 and terminates at an injection sleeve surface 17 that is not flush with the lower surface 11. The sleeve 13 may include a counterbore such that an opening 15 positioned adjacent the second surface 9 has a larger dimension than an end of the sleeve 13 proximate the third surface 11.

Figure 2:
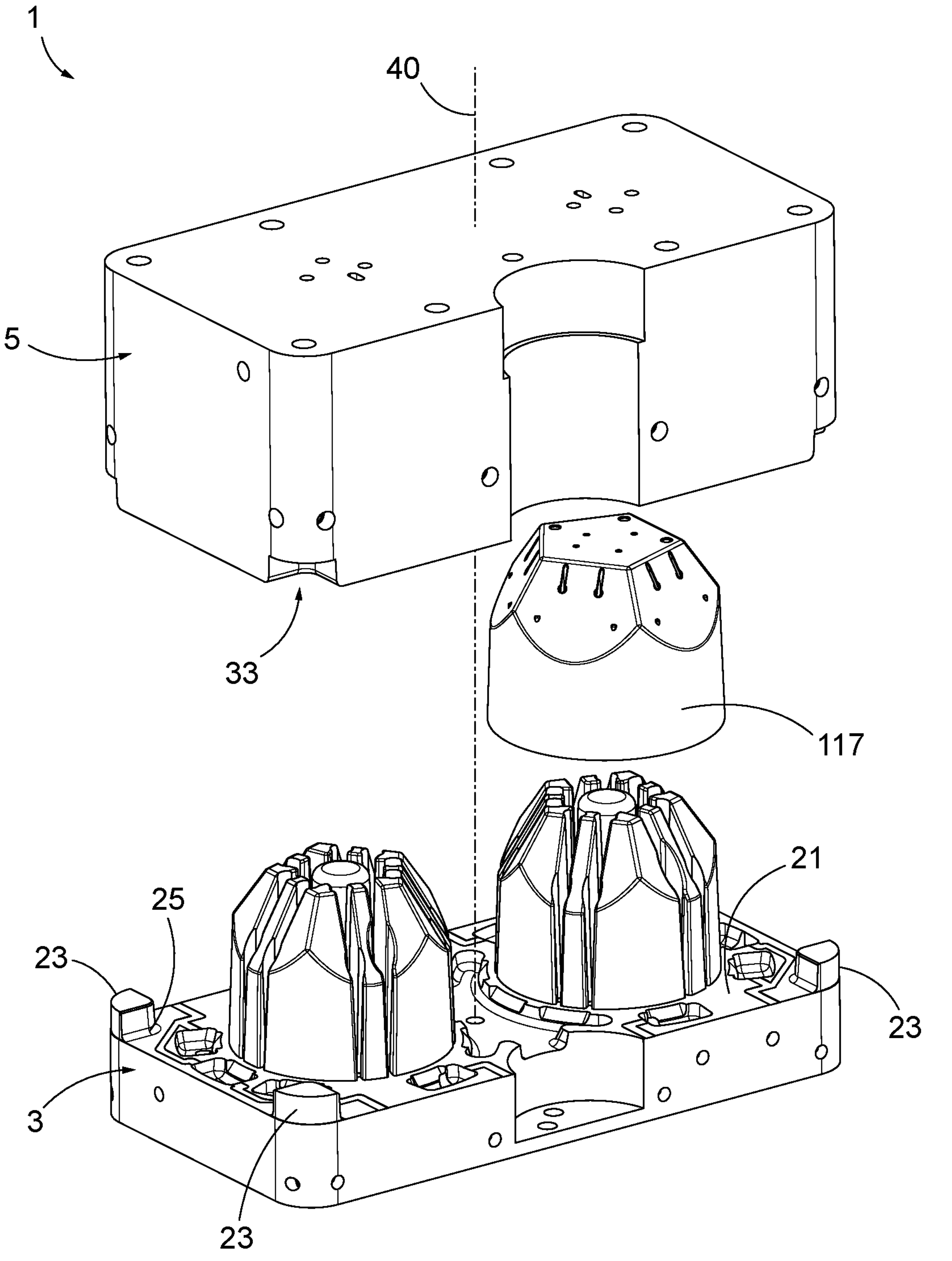
FIG. 2 is an exploded view of the mold of FIG. 1.

FIG. 2 shows an exploded view of the mold 1 and a molded part 117. The first mold portion 3 includes a first inner surface 21. In the illustrated embodiment, four tabs 23 protrude from the first inner surface 21; in other embodiments, the first mold portion 3 may include fewer or more tabs. In the illustrated embodiment, the tabs 23 are positioned at the corners of the first inner surface 21, and each tab 23 has a cross section that is generally shaped like a quarter circle; in other embodiments, the tabs may be positioned in another manner, and each tab may have a different shape. A first round edge 25 is formed between the first inner surface 21 and each of the tabs 23.

Figure 3:
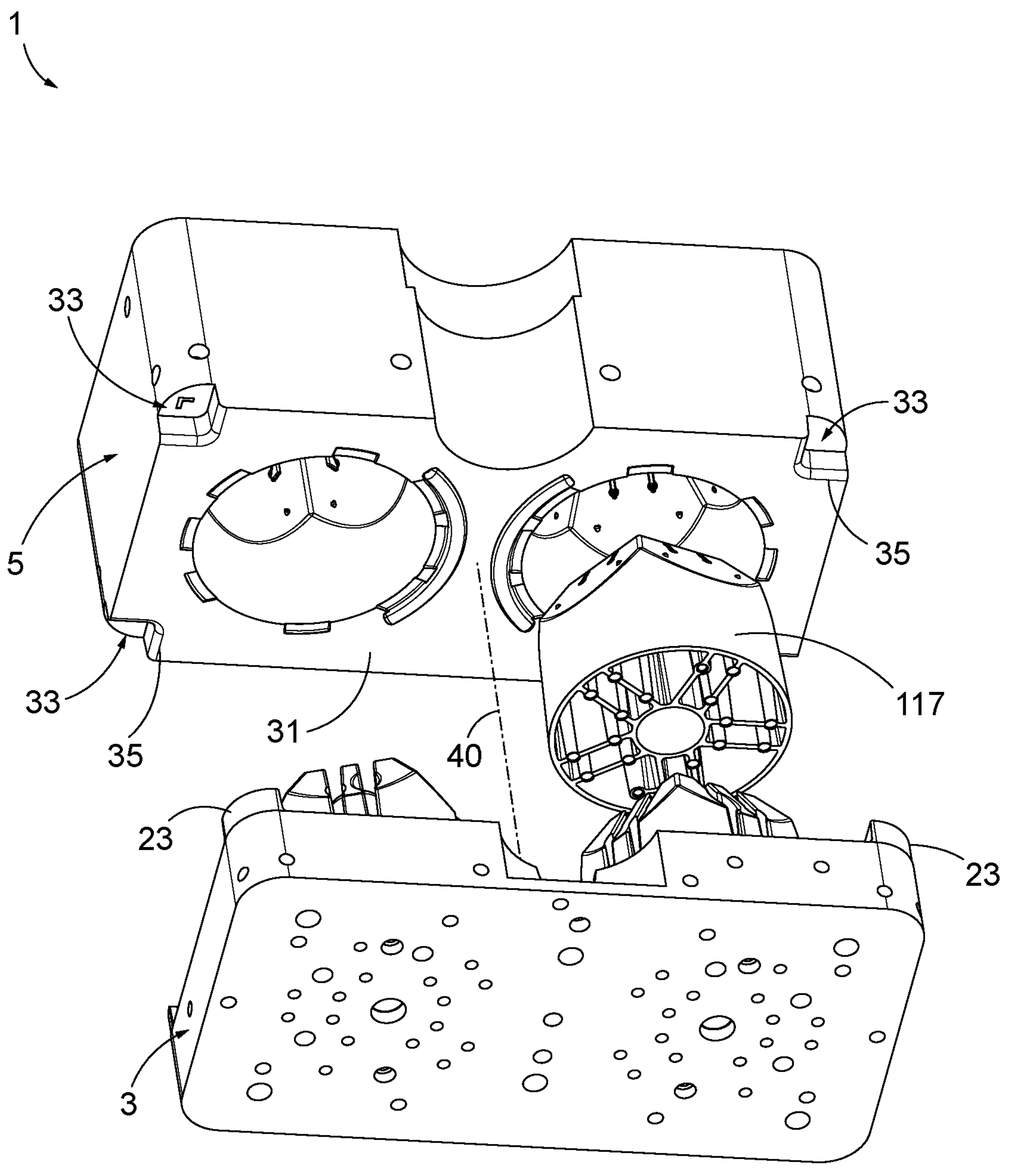
FIG. 3 is an exploded view of the mold of FIG. 1.

FIG. 3 shows a lower exploded view of the mold 1 and the molded part 117. The second mold portion 5 has a second inner surface 31. The second inner surface 31 abuts and is sealed against the first inner surface 21 (FIG. 2) when the first mold portion 3 is secured to the second mold portion 5. In the illustrated embodiment, a recess 33 is positioned at each corner of the second inner surface 31; in other embodiments, the recesses 33 may be positioned in another manner, and/or the second mold portion 5 may include fewer or more recesses 33. The recesses 33 are generally complementary to the tabs 23, and each recess 33 receives one tab 23. A second round edge 35 is formed between the second inner surface 31 and the recess 33. The first mold portion 3 is secured to the second mold portion 5 by aligning each tab 23 so that it fits into a recess 33. When secured together, the first mold portion 3 and the second mold portion 5 form the injection sleeve 13.

Figure 4:
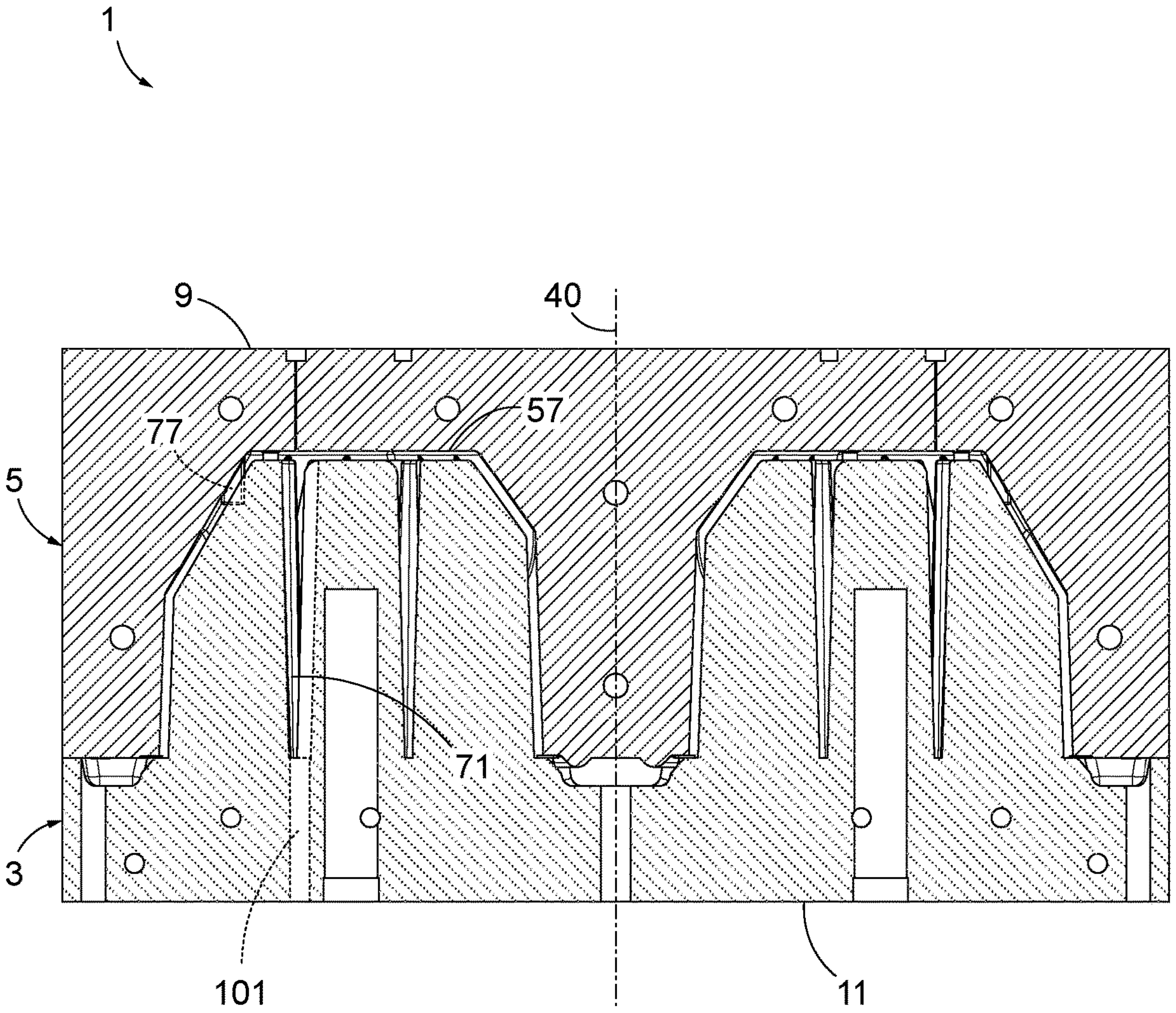
FIG. 4 is a section view of the mold of FIG. 1 viewed along section 4-4.

FIG. 4 shows a section view of the mold 1. A draw axis 40 is formed normal to the second surface 9 and the third surface 11 and extends through the first mold portion 3 and the second mold portion 5.

Figure 5:
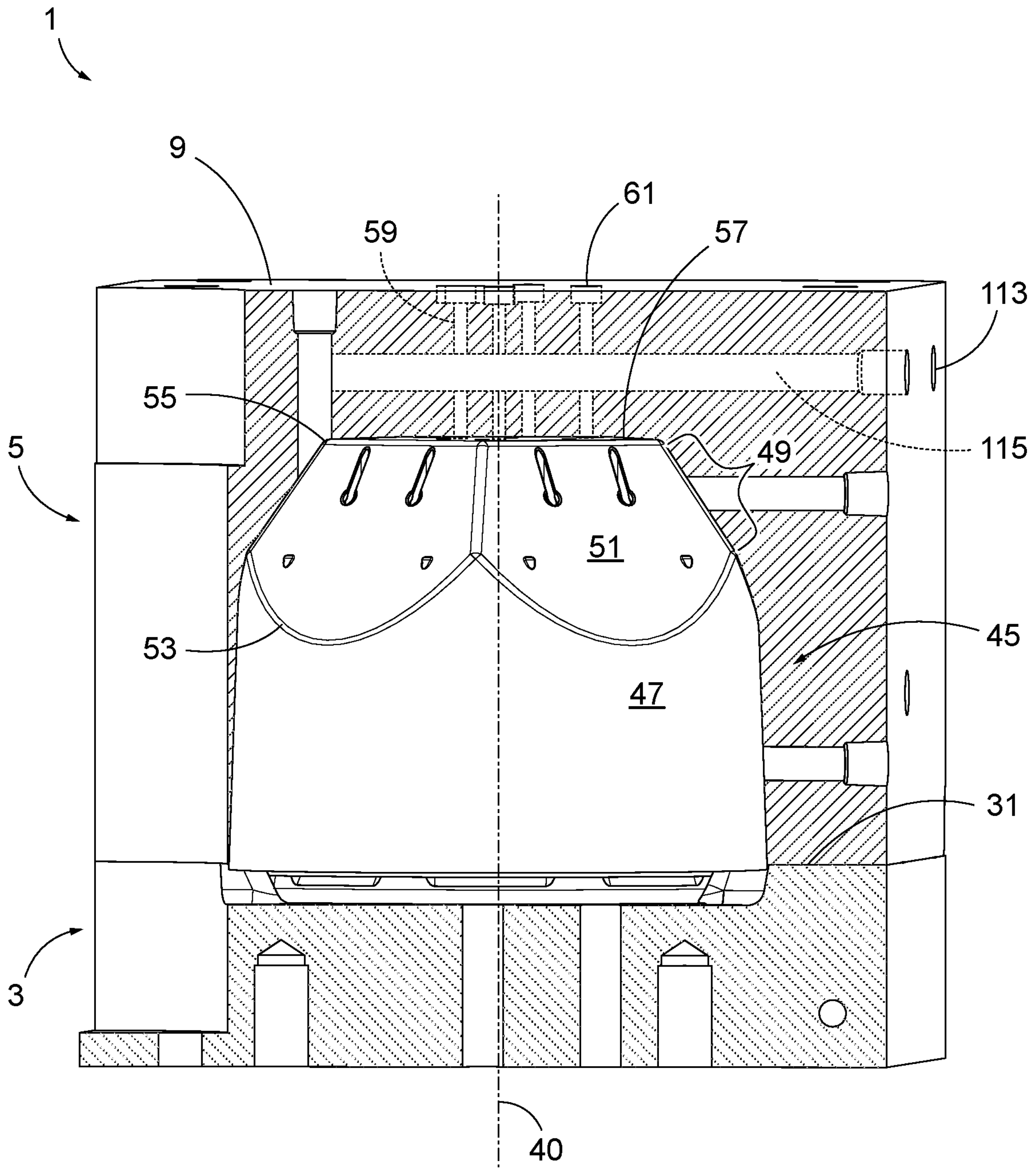
FIG. 5 is a section view of the mold of FIG. 1 viewed along section 5-5.

FIG. 5 is a side section view of the mold 1. The second mold portion 5 includes a mold cavity surface 45. In the illustrated embodiment, the mold cavity surface 45 includes a cylindrical lower portion 47 and an upper portion 49. The lower portion 47 is positioned adjacent the second inner surface 31. The upper portion 49 includes inclined surfaces 51 oriented at an oblique angle or neither perpendicular nor parallel to the draw axis 40. In the illustrated embodiment, the upper portion 49 includes five inclined surfaces 51; in other embodiments, the upper portion 49 may include fewer or more surfaces. The inclined surfaces 51 are positioned around an end surface 57. In the illustrated embodiment, the end surface 57 is perpendicular to the draw axis 40. A plurality of conduits 59 extend from the end surface 57 to the second surface 9. In the illustrated embodiment, the mold 1 includes four conduits; in other embodiments, the mold 1 may include fewer or more conduits 59. Each of the conduits 59 are in communication with an injection aperture 61 located on the second surface 9.

Figure 6:
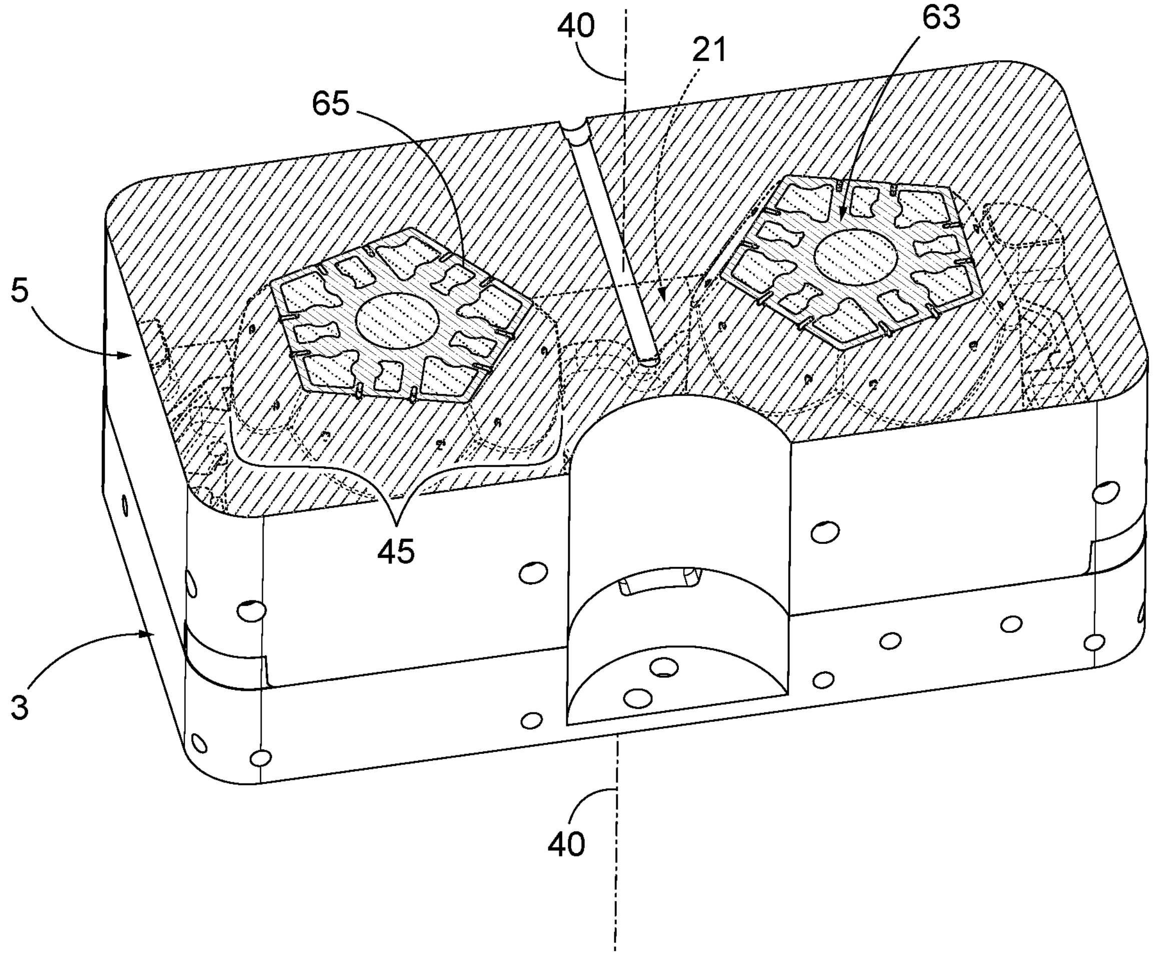
FIG. 6 is a section view of FIG. 1 viewed along section 6-6.

As shown in FIG. 6, a mold cavity 63 is formed when the first mold portion 3 and the second mold portion 5 are secured together. In the illustrated embodiment, the mold cavity surface 45 is positioned on one side of the cavity 63, and a mold cavity interior 65 is positioned opposite the mold cavity surface 45. In other embodiments, the mold cavity surface 45 may be formed differently between the first mold portion 3 and second mold portion 5.

Figure 7A:
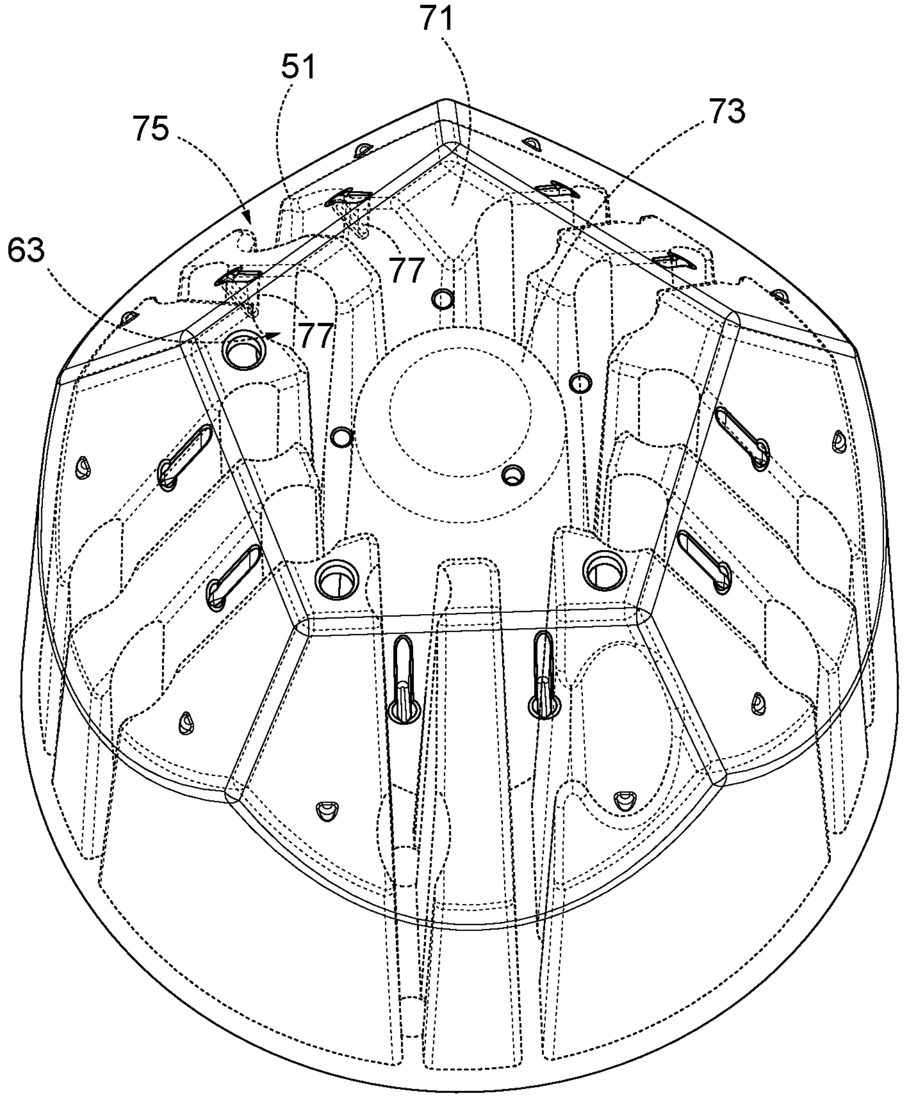
FIG. 7A is a perspective view of a mold cavity.
Figure 7B:
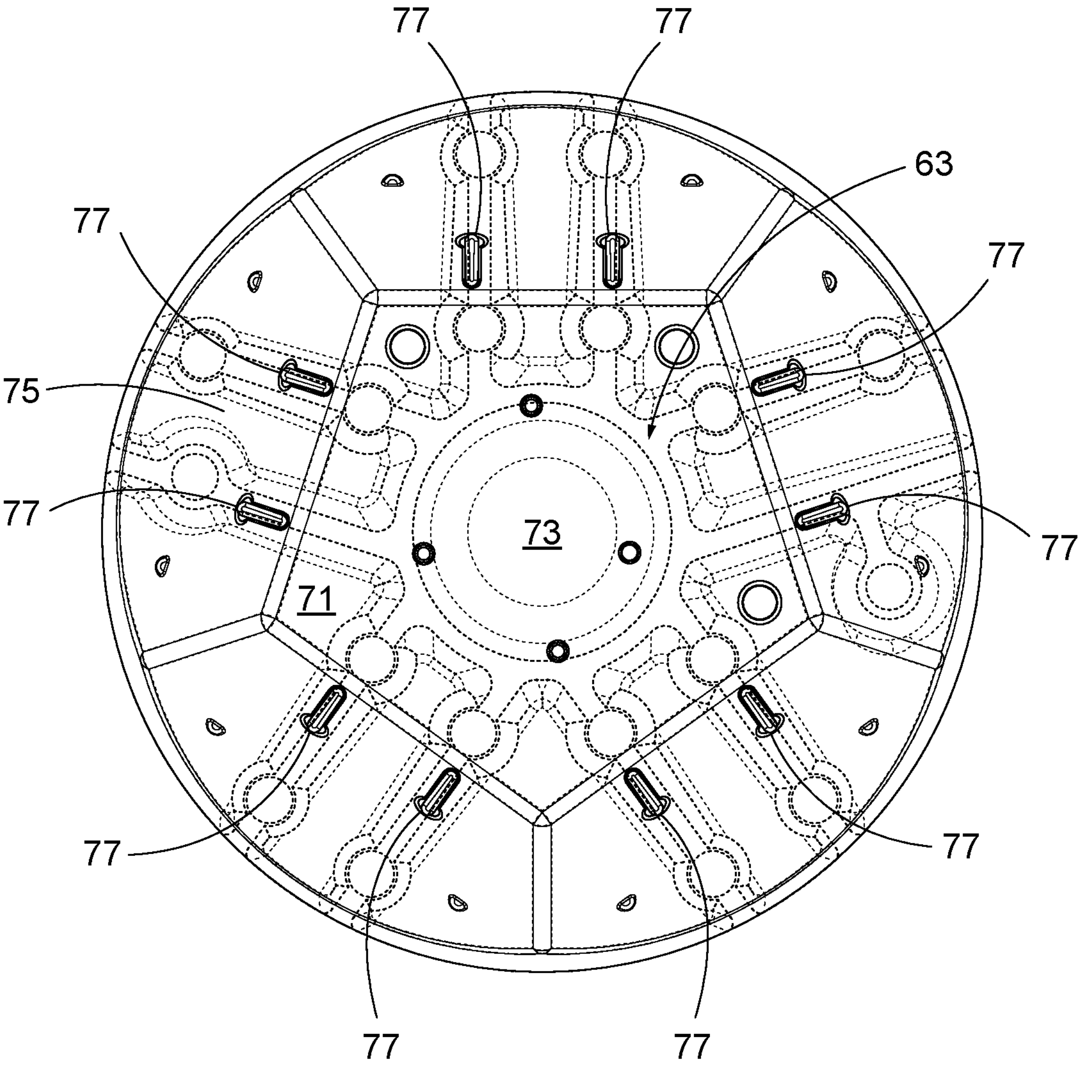
FIG. 7B is a bottom view of the mold cavity of FIG. 7*a*.

FIG. 7A shows an interior portion of the mold cavity 63. The mold cavity includes a plurality of peripheral protrusions 71. In the illustrated embodiment, there are ten peripheral protrusions 71 positioned along a perimeter of the mold cavity 63, and a center protrusion 73 positioned between the peripheral protrusions 71 which has a generally circular cross section. The plurality of protrusions 71 and the center protrusion 73 extend from the first inner surface 21 (FIG. 2). In the illustrated embodiment, the plurality of protrusions 71 and the center protrusion 73 are hollow.

As shown in FIGS. 7A and 7A, an internal surface 75 is positioned on the second mold portion 5 opposite each inclined surface 51 (FIG. 7A). In the illustrated embodiment, the second mold portion 5 includes five internal surfaces 75; in other embodiments, the second mold portion 5 may include fewer or more internal surfaces 75. A pair of projections 77 extends from each internal surface 75. In other embodiments, each internal surface 75 may include fewer or more projections 77.

Figure 8:
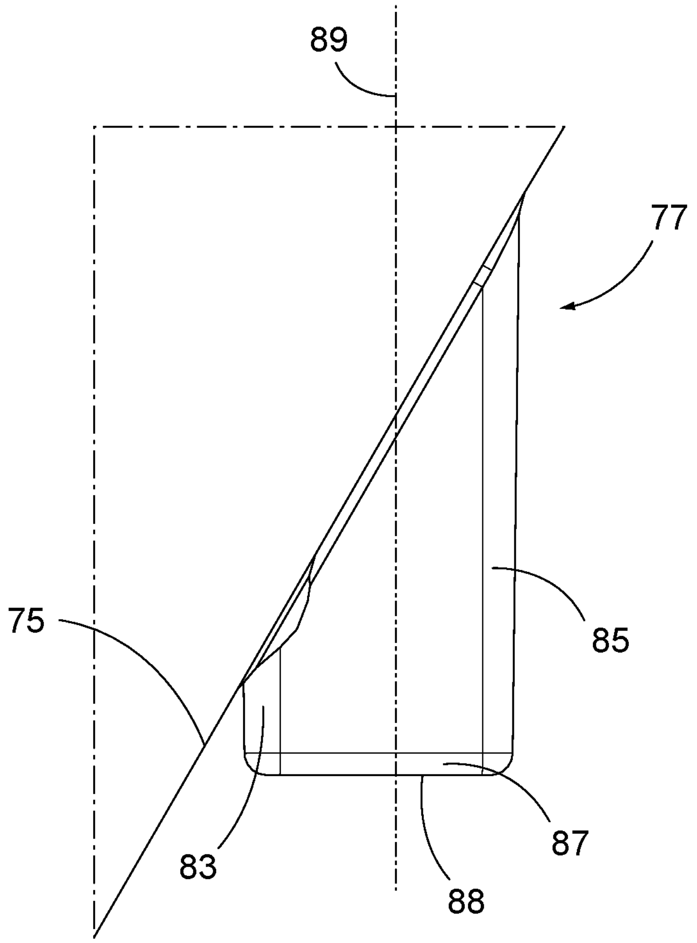
FIG. 8 is a side view of a projection.

FIG. 8 shows a side view of the projection 77. In the illustrated embodiment, the internal surface 75 extends along a plane, and the projection 77 forms an oblique angle or an angle neither perpendicular nor parallel relative to the internal surface 75. The projection 77 also extends away from the internal surface 75. In the illustrated embodiment, the projection 77 has an elongated cross section. In the illustrated embodiment, the projection 77 has a trapezoidal shaped profile. The projection 77 includes a first end 83, a second end 85, a first side surface 86 (FIG. 9A), and a second side surface 87. The side surfaces 86, 87 extend between the first end 83 and the second end 85. A lower extent 88 extends between the side surfaces 86, 87 and the ends 83, 85. The lower extent 88 is positioned generally perpendicular to a projection axis 89. The projection axis 89 extends along the length of the projection profile. In the illustrated embodiment, the projection axis 89 is parallel to the draw axis 40.

Figure 9A:
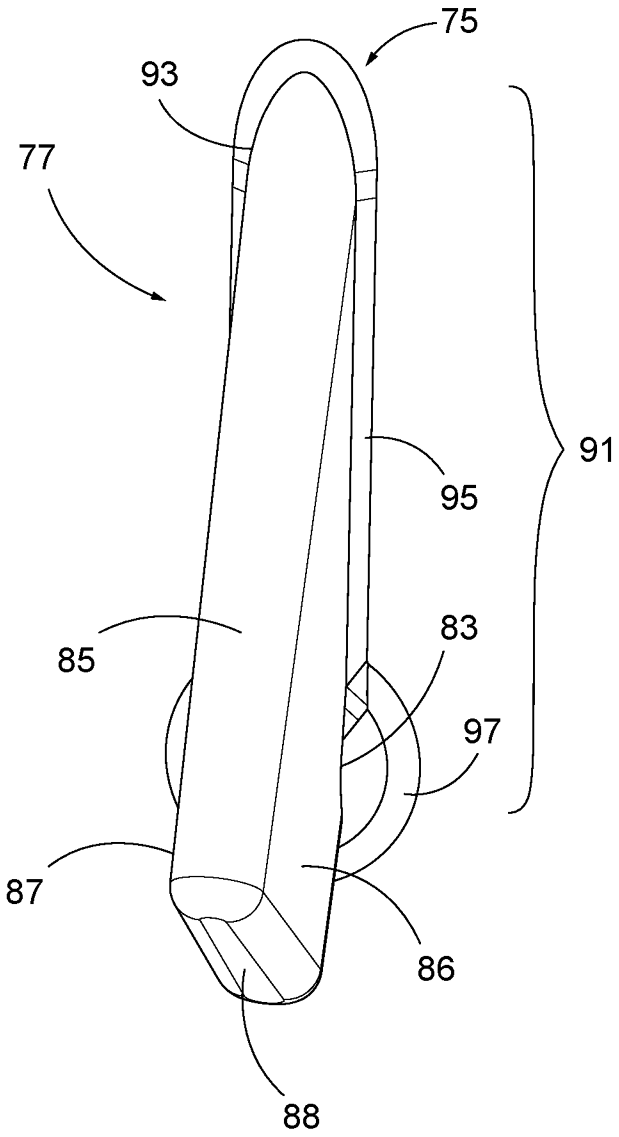
FIG. 9A is a front view of the projection of FIG. 8.

FIG. 9A shows a front view of the projection 77. The projection includes a base 93 opposite the second end 85, adjacent the internal surface 75. In the illustrated embodiment, a lip 91 extends around the perimeter of the base 93. The lip 91 includes an elongated portion 95 and a circular portion 97. The elongated portion 95 is positioned proximate the mold cavity upper surface 57 (FIG. 4). The circular portion 97 is positioned proximate the first end 83 of the projection 77. In the illustrated embodiment, the lip 91, as well as the second end 85 and the side surfaces 86, 87, are rounded.

Figure 9B:
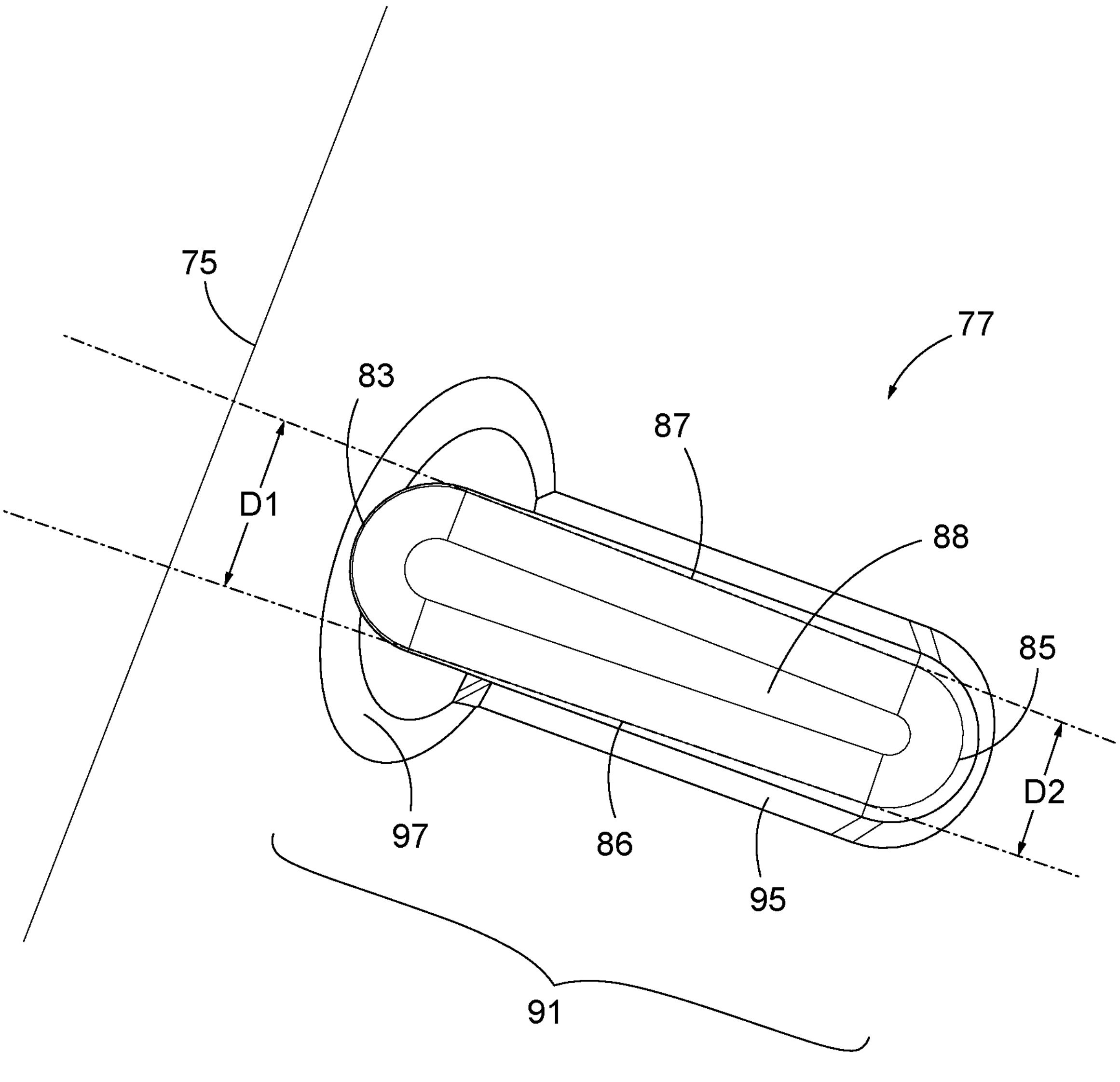
FIG. 9B is an end view of the projection of FIG. 8.

FIG. 9B shows a bottom view of the projection 77. In the illustrated embodiment, the side surfaces 86, 87 are tapered between the first end 83 and the second end 85. The first end 83 has a width D1 that is larger than a width D2 of the second end 85 and is positioned proximate the circular portion 97.

Figure 10:
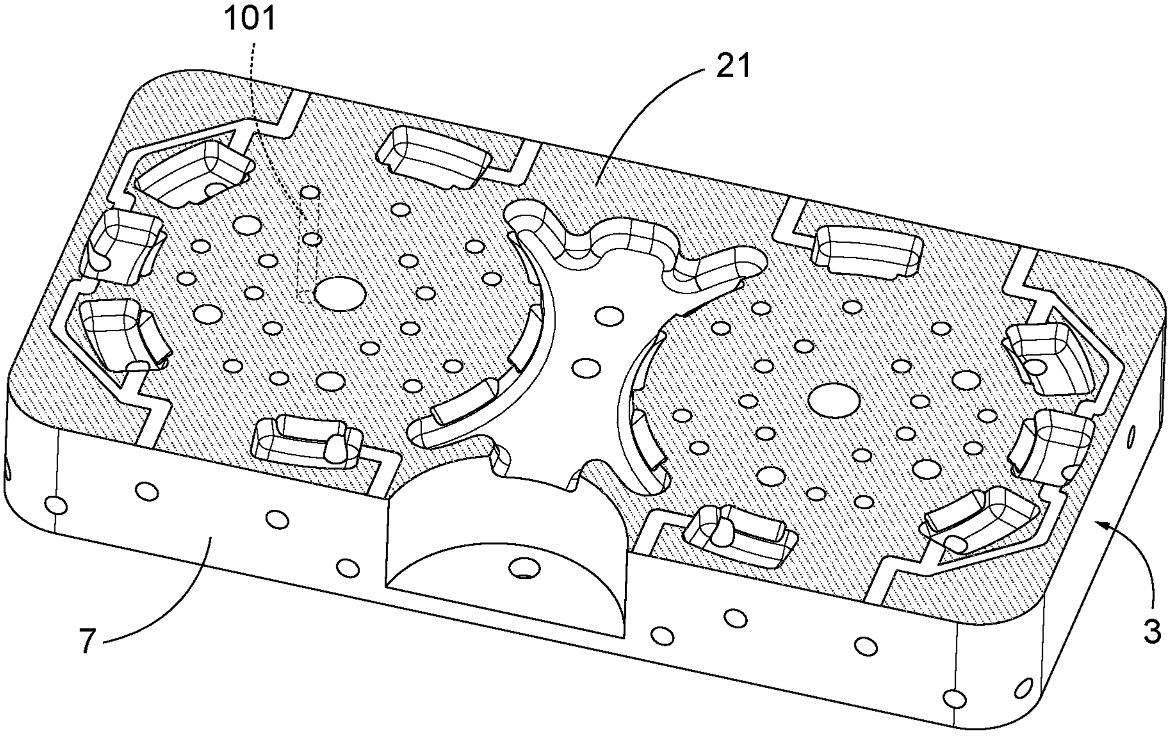
FIG. 10 is a perspective view of a first mold portion.

Referring to FIG. 10, the first mold portion 3 includes a plurality of first channels 101. In the illustrated embodiment, the first channels 101 are parallel to the first surface 7 and extend to the first inner surface 21.

Figure 11:
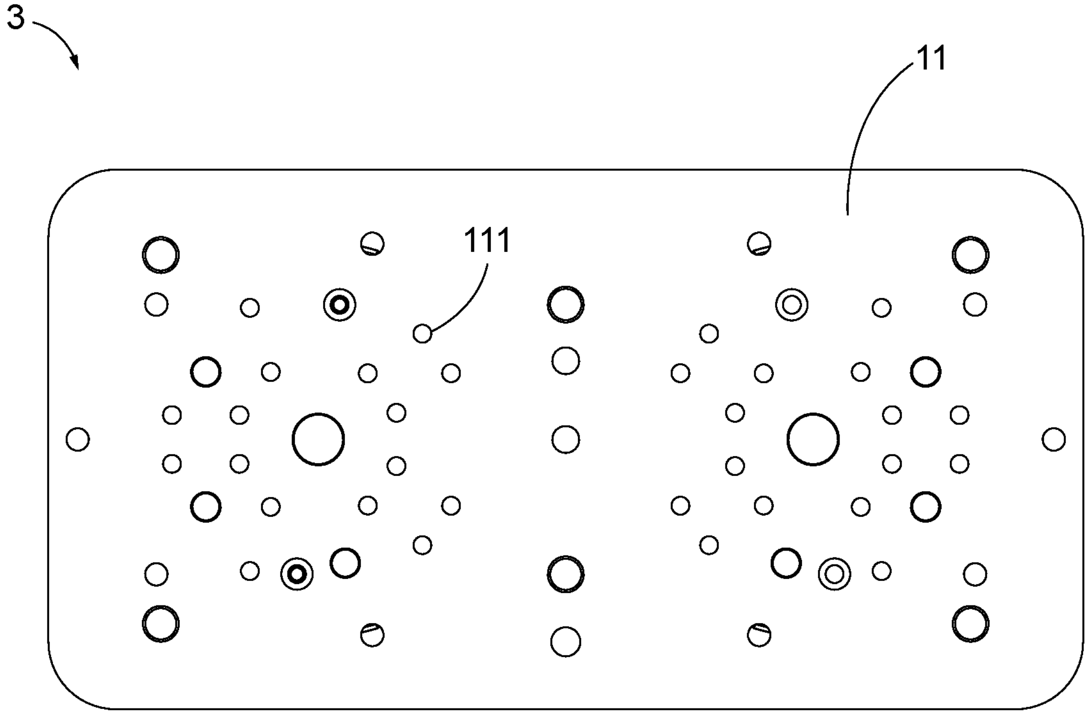
FIG. 11 is a bottom view of the first mold portion of FIG. 10.

As shown in FIG. 11 the third surface 11 of the mold 1 includes a plurality of pin apertures 111. The pin apertures 111 lead to the plurality of first channels 101 (FIG. 10).

As illustrated in FIG. 5, the first mold portion 3 and the second mold portion 5 can have cooling apertures 113 on their outer surfaces. Each cooling aperture 113 may be in communication with a cooling channel 115. In the illustrated embodiment, each cooling channel 115 extends from one exterior surface to another exterior surface of the mold 1.

Referring again to FIG. 4, each of the plurality of first channels 101 extends into the plurality of protrusions 71 as illustrated in FIG. 4. Each first channel 101 is aligned with one of the protrusions 71 in order to form a continuous, hollow column.

To form a molded part, nozzles (not shown) can be inserted into injection apertures 61 shown in FIG. 5. Liquid material is introduced through the nozzles and into the mold cavity 63 (FIG. 6) through the plurality of conduits 59. Liquid material fills the mold cavity and begins to solidify. The material solidifies around the plurality of protrusions 71 and the center protrusion 73. The liquid material also solidifies around the projections 77 and the lip 91.

To remove the molded part 117 from the cavity 63, the second mold portion 5 is separated from the first mold portion 3. Ejector pins (not shown) are inserted into the pin apertures 111 (FIG. 11) and extend into the hollow column formed by aligning the first channel 101 and the protrusion 71 (FIG. 4). The ejector pins push against the protrusions 71 and separate the molded part 117 from the first mold portion 3 (FIG. 3).

Figure 12:
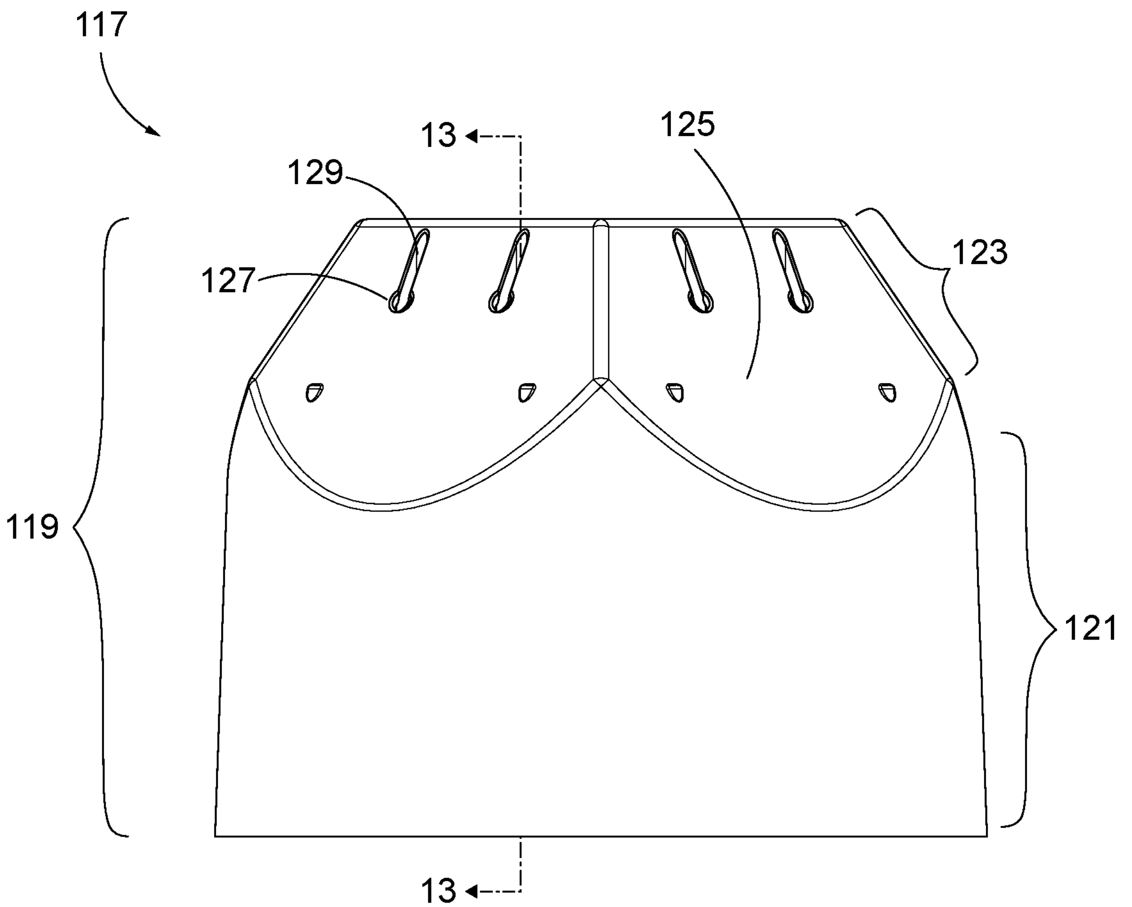
FIG. 12 is a side view of a molded part.

FIG. 12 shows the molded part 117 according to one embodiment and formed by the mold 1 (FIG. 1). The molded part 117 has an outer surface 119 including a first or lower portion 121 and a second or upper portion 123. The upper portion 123 includes a plurality of inclined surfaces 125. The projection 77 (FIG. 8) forms an elongated slot 129 in one of the inclined surfaces 125 of the molded part 117. The circular portion 97 of the lip 91 (FIG. 9A) forms an indentation 127 adjacent one end of the slot 129. The indentation 127 extends into the inclined surface 125 in a direction substantially normal to the associated inclined surface 125. The indentation 127 is positioned proximate the molded cylindrical lower portion 121. In the illustrated embodiment, the lip 91 (FIG. 9A) has a diameter greater than a diameter of an ordinary screw so indentation 127 is formed with a diameter that is greater than the diameter of an ordinary screw.

Figure 13:
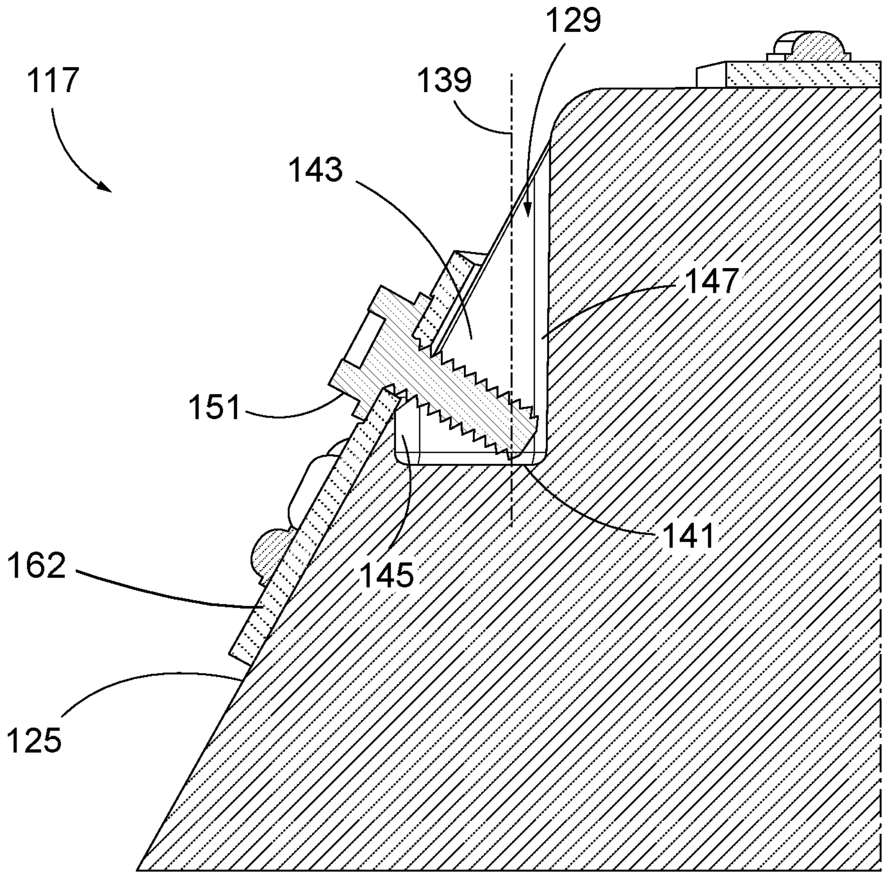
FIG. 13 is a section view of the molded part of FIG. 12 viewed along section 13-13.

FIG. 13 shows a section view of the molded part 117. The slot 129 is formed by the projection 77 (FIG. 8) and has a similar cross section. An aperture axis 139 is oriented normal to an inner end surface 141 and forms an oblique angle with respect to the associated inclined surface 125. Due to the tapered shape of the sides 86, 87 of the projection 77 (FIG. 9B), the slot 129 includes slot walls 143 that are tapered inwardly from an end 145 proximate the indentation 127 (FIG. 12) toward an opposite end 147 of the slot 129. A fastener 151 (e.g., a self-tapping screw) is inserted into the slot 129 through the indentation 127 (FIG. 12), normal to the inclined surface 125 and at an oblique angle relative to the aperture axis 139. In the illustrated embodiment, the tapered shape of the projection 77 (FIG. 9B) causes the slot 129 to have a width that decreases from the one end 145 toward the opposite end 147. As the fastener 151 is inserted, the slot walls 143 extend inwardly and the threads of the fastener 151 engage the slot walls 143 to secure the fastener 151 relative to the part 117.

Figure 14:
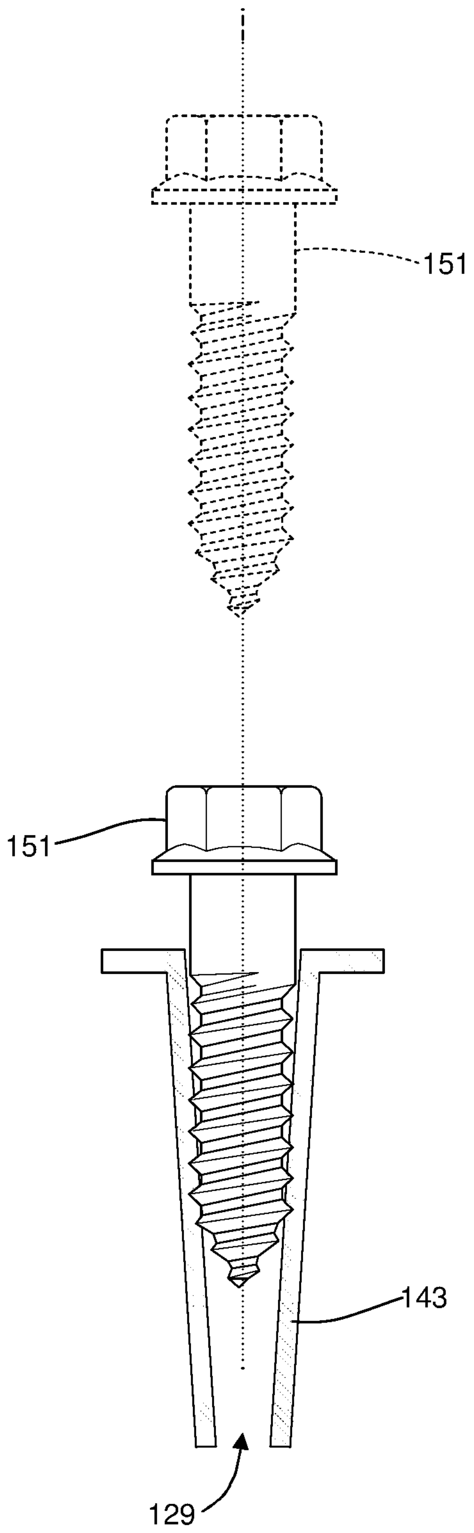
FIG. 14 is a front section view of the molded part of FIG. 13 illustrating fastener engaging the walls of the slot.

FIG. 14 shows the fastener 151 secured inside the slot 129. The slot walls 143 are tapered, and a narrow end of the slot 129 is narrower than a width of the fastener 151. The threads of the fastener 151 gradually engage the slot walls 143 as the fastener 151 passes through the slot 129. Stated another way, as the fastener 151 extends deeper into the slot 129, the threads of the fastener 151 engage more of the walls 142.

The mold 1 permits a feature (e.g., a slot 129) to be formed on an inclined surface 125 of the molded part 117 without requiring side action or additional mold components that can complicate the mold operation. Side action dies result in uneven surfaces (e.g., seams) where the side action die abuts the rest of the mold, thereby creating uneven surfaces around the resulting feature on the molded part. An uneven surface prevents mating parts or adjacent parts from properly abutting against the molded part. The mold 1 substantially reduces the likelihood of uneven surfaces around the slot 129 on the inclined surface 125, permitting a mating part to abut the inclined surface 125 in a flush manner. For example, in the embodiment of FIG. 13, the molded part 117 is a heat sink and the inclined surface 125 is flush with an LED board 162, thereby facilitating heat transfer from the LED board 162 to the heat sink.

Although aspects have been described in detail with reference to certain preferred embodiments, variations and modifications exist within the scope and spirit of one or more independent aspects as described.

What is claimed is:

1. A mold comprising:

a first mold portion;

a second mold portion secured against the first mold portion along a draw axis to form at least one mold cavity, the second mold portion including an orifice and an internal surface disposed within the orifice oriented at an oblique angle relative to the draw axis; and a projection extending from the internal surface along a projection axis parallel to the draw axis, the projection being tapered in a direction perpendicular to the projection axis.

2. The mold of claim 1, wherein the projection forms an elongated profile with a first end proximate to the internal surface, a second end opposite the first end, and a pair of side surfaces extending between the first end and the second end, and wherein the side surfaces are tapered such that a width of the projection proximate to the first end is larger than a width of the projection proximate to the second end.

3. The mold of claim 1, wherein the projection axis is oriented parallel to the draw axis.

4. The mold of claim 1, further comprising a lip positioned between the internal surface and at least a portion of the projection.

5. The mold of claim 4, wherein the projection forms an elongated profile with a first end proximate to the internal surface, a second end opposite the first end, and a pair of side surfaces extending between the first end and the second end, and wherein the lip includes a circular profile with a diameter configured to be wider than a width of the projection proximate to the first end.

6. The mold of claim 1, wherein the projection includes a trapezoidal shape.

7. The mold of claim 1, wherein the first mold portion includes an inner surface and at least one protrusion extending from the inner surface, wherein the second mold portion includes an orifice configured to receive the at least one protrusion, and wherein the internal surface is disposed within the orifice.

8. The mold of claim 1, further comprising a lip positioned on the internal surface and extending between a first end and a second end, wherein the lip includes an elongated portion proximate to the second end and a circular portion proximate to the first end, and wherein the lip is rounded.

9. The mold of claim 1, wherein the projection includes a first end extending along an oblique angle from the internal surface and a second end parallel to the first end, the mold further comprising a lip formed at an intersection between the first end and the internal surface.

10. The mold of claim 1, wherein the projection includes a lower surface oriented substantially perpendicular to the projection axis, and wherein a first end of the lower surface proximate to the internal surface includes a first diameter and a second end of the lower surface opposite the first end includes a second diameter smaller than the first diameter.

11. A mold comprising:

a first mold portion including at least one protrusion;

a second mold portion including an orifice and being secured against the first mold portion along a draw axis to form at least one mold cavity where the orifice receives the at least one protrusion, the second mold portion including an internal surface disposed within the orifice and oriented at an oblique angle relative to the draw axis; and a projection extending from the internal surface along a projection axis, the projection being tapered along a direction oblique to the internal surface.

12. The mold of claim 11, wherein the direction oblique to the internal surface is perpendicular to the projection axis.

13. The mold of claim 11, wherein the projection forms an elongated profile with a first end proximate to the internal surface, a second end opposite the first end, and a pair of side surfaces extending between the first end and the second end, and wherein the side surfaces are tapered such that a width of the projection proximate to the first end is larger than a width of the projection proximate to the second end.

14. The mold of claim 11, wherein the projection axis is oriented parallel to the draw axis.

15. The mold of claim 11, further comprising a lip positioned between the internal surface and at least a portion of the projection.

16. The mold of claim 15, wherein the projection forms an elongated profile with a first end proximate to the internal surface, a second end opposite the first end, and a pair of side surfaces extending between the first end and the second end, and wherein the lip includes a circular profile with a diameter configured to be wider than a width of the projection proximate to the first end.

17. The mold of claim 11, wherein the first mold portion includes an inner surface and at least one protrusion extending from the inner surface, wherein the second mold portion includes an orifice configured to receive the at least one protrusion, and wherein the internal surface is disposed within the orifice.

18. The mold of claim 11, further comprising a lip positioned on the internal surface and extending between a first end and a second end, wherein the lip includes an elongated portion proximate to the second end and a circular portion proximate to the first end, and wherein the lip is rounded.

19. The mold of claim 11, wherein the projection includes a first end extending along an oblique angle from the internal surface and a second end parallel to the first end, the mold further comprising a lip formed at an intersection between the first end and the internal surface.

20. The mold of claim 11, wherein the projection includes a lower surface oriented substantially perpendicular to the projection axis, and wherein a first end of the lower surface proximate to the internal surface includes a first diameter and a second end of the lower surface opposite the first end includes a second diameter smaller than the first diameter.

* * * * *